United States Patent [19]

Pingali

[11] Patent Number: 6,005,610
[45] Date of Patent: Dec. 21, 1999

[54] AUDIO-VISUAL OBJECT LOCALIZATION AND TRACKING SYSTEM AND METHOD THEREFOR

[75] Inventor: Sarma VGK Pingali, East Brunswick, N.J.

[73] Assignee: Lucent Technologies Inc., Murray Hill, N.J.

[21] Appl. No.: 09/012,393

[22] Filed: Jan. 23, 1998

[51] Int. Cl.⁶ .................................................. H04N 5/225
[52] U.S. Cl. ............................ 348/169; 348/15; 382/103
[58] Field of Search ..................................... 348/169, 170, 348/142–143, 152–155, 162–164, 13–15, 20, 25; 382/103; H04N 5/225, 7/18

[56] References Cited

U.S. PATENT DOCUMENTS

| | | | |
|---|---|---|---|
| 3,906,431 | 9/1975 | Clearwaters et al. | 367/122 |
| 4,067,015 | 1/1978 | Mogavero et al. | 340/825.7 |
| 4,857,912 | 8/1989 | Everett, Jr. et al. | 340/825.3 |
| 5,231,609 | 7/1993 | Gaer | 367/99 |
| 5,521,634 | 5/1996 | McGray | 348/169 |
| 5,737,011 | 4/1998 | Lukacs | 348/15 |
| 5,844,599 | 12/1998 | Hildin | 348/15 |

OTHER PUBLICATIONS

Tsai, "An Efficinet and Accurate Camera Calibration Technique for 3D Machine Vision", IEEE, pp. 364–374, May 1986.
Kellerman, "A Self–Steering Digital Microphone Array", Acoustic Research Department, AT&T Bell Laboratories, IEEE, pp. 3581–3584, Jul. 1991.
Flanagan et al, "Computer–steered Microphone Arrays for Sound Transduction in Large Room", J. Acoust. Soc. Am., vol. 78, No. 5, pp. 1508–1518, Nov. 1985.
Brandstein et al, "A Closed–Form Method for Finding Source Locations From Microphone–Array Time–Delay Estimates", IEEE, pp. 3019–3022, May 1995.
J. Acoust. Soc. Am., vol. 100, No. 4, Pt. 2, 3rd Joint Meeting: Acoustical Societies of America and Japan, p. 2697, Oct. 1996.
Omologo et al, "Acoustic Event Localization Using a Cross–power–Spectrum Phase Based Technique", IEEE, pp. 11–273 to 11–276, 1994.
Oliver et al, "LAFTER: Lips and Face Real Time Tracker", MIT Media Laboratory, IEEE, pp. 123–129, 1997.
Jebara et al, "Parametrized Structure from Motion for 3D Adaptive Feedback Tracking of Faces", MIT Media Laboratory, IEEE, pp. 144–150, 1997.
S.M. Smith and J.M. Brady, "Assest–2: Real–Time motion segmentation and shape tracking," IEEE *Transactions on Pattern Analysis and Machine Intelligence*, 17(8):814–820, 1995.
Schiele et al, "Gaze Tracking Based on Face–Color", International Workshop on Automatic Face and Gesture Recognition, Carnegie Mellon University, pp. 344–349, 1995.

(List continued on next page.)

*Primary Examiner*—Vu Le

[57] ABSTRACT

A method for integrated audio-visual localizing and tracking of at least one object. The method includes the steps of capturing and transmitting an image of a video scene using a camera at an instant of time, identifying an object contained in the image having a preselected visual feature, and estimating a location of the object by determining an angular orientation relative to the image plane of the camera of an imaginary line extending from an optical center of the camera to a point on the image plane of the camera representing a portion of the object. The method further includes the steps of converting acoustic waves from an audio source into audio signals using at least two microphones at substantially the same time, identifying the audio source by determining a locus of points representing an estimate of the location of the audio source on the basis of the audio signals. An improved estimate of the location of the object is computed by determining the location of a region of intersection between the imaginary line and the locus.

16 Claims, 2 Drawing Sheets

OTHER PUBLICATIONS

Akio Shio and Jack Sklansky, "Segmentation of People in Motion", NTT Human Interface Laboratories and Department of Electrical Engineering, University of California, Irvine.

Segen et al, "A Camera–Based System for Tracking People in Real Time", Bell Laboratories, Proc. of ICPR, pp. 63–67, 1996.

J.K. Aggarwal and Q. Cai, "Human motion analysis: A review," in IEEE *Nonrigid and Articulated Motion Workshop*, pp. 90–102, 1997.

D.R.Fischell and C.R. Coker, "A Speech Direction Finder," in *Proceedings of the IEEE International Conference on Acoustics, Speech and Signal Processings*,pp. 19.8.1–19.8.4, 1984.

D. Hog, "Model based vision: A program to see a walking person," *Image and Vision Computing*, 1(1):5–20, 1983.

A. Jacquin and A. Eleftheriadis, "Automatic location tracking of faces and facial features in video sequences" in *Proceedings of the International Workshop on Automatic Face and Gesture Recognition*, pp. 142–147, 1995.

S. Pingali and J. Segen, "Performance evaluation of people tracking systems," in Third IEEE *Workshop on Applications of Computer Vision*, 1996.

K. Rohr, "Towards model recognition of human movements in image sequences" *Computer Vision Graphics and Image Processing:Image Understanding*, 59(1):94–115, Jan. 1994.

J. Segen and S. Pingali, "A camera based system for tracking people in real time," in IAPR International Conference on Pattern Recognition, 1996.

AUDIO-VISUAL OBJECT LOCALIZATION AND TRACKING SYSTEM AND METHOD THEREFOR

FIELD OF THE INVENTION

The present invention is directed to an apparatus and a method for object localization and tracking and in particular, a system and a process for integrating both audio and visual cues to localize and track a moving object, typically a person, in real time.

BACKGROUND OF THE INVENTION

Single-modality systems for localizing and tracking moving objects based only on either audio or visual cues are known. These single-modality systems are not suitable for multimedia applications such as, for example, teleconferencing, multimedia kiosks and interactive games where accurate localizing and tracking of an object or audio-visual source, typically a person, is important.

For example, in Rashid, R. F., "Towards A System For The Interpretation Of Moving Light Displays", 2 *IEEE Transactions on Pattern Analysis and Machine Intelligence*, 574–581 (1980), a method is described for interpreting moving light displays (MLD). In general, Rashid teaches segmenting out from MLD images individual points corresponding to moving people. The individual points are grouped together to form clusters based on, inter alia, the positions and velocities of the individual points; the formed clusters represent individual objects. Tracking is performed by matching points between consecutive frames based on the relative distances between the location of points in the current frame and the location of predicted points in a previous frame. The predicted position is based on the average velocity of the point in the previous frame and the relative distance, which is calculated using a Euclidean function.

The technique described by Rashid has several drawbacks. Specifically, the MLD system requires several frames before a good object separation is obtained, and no criteria is provided for determining when satisfactory object separation has occurred. In addition, no mechanism is provided for propagating the generated clusters to prior and subsequent frames for continuity in the motion representation.

In another camera-only tracking system described by Rossi, M. and Bozzoli, A., in "Tracking And Counting Moving People", *Proceedings Of The Second IEEE International Conference On Image Processing*, 212–16 (1994), a vertically mounted camera is employed for tracking and counting moving people. This system operates under the assumption that people enter a scene along either the top or bottom of the image where alerting zones are positioned for detecting people moving into the scene. A major drawback of this system, however, is that in reality people can also appear in a scene, inter alia, from behind another object or from behind an already-identified person. In other words, people may be wholly or partially occluded upon initially entering a scene and such persons would not be identified by this system. The problem of identifying occluded persons is also present in the system described by Rohr, K., in "Towards Model Based Recognition Of Human Movements In Image Sequences", 59 *Computer Vision, Graphics And Image Processing: Image Understanding*, 94–115 (1994).

In addition, the systems described by Smith, S. M., and Brady, J. M., in "A Scene Segmenter: Visual Tracking of Moving Vehicles", 7 *Engineering Applications Of Artificial Intelligence* 191–204 (1994); and in "ASSET-2: Real-Time Motion Segmentation And Shape Tracking", 17 *IEEE Transactions On Pattern Analysis And Machine Intelligence*, 814–20 (1995), are designed specifically for tracking objects such as moving vehicles, and accordingly identify features representing corners or abrupt changes on the boundaries of the vehicles. This approach utilizes the fact and requires that the tracked objects are rigid and, thus, permits the use of constant velocity or constant acceleration models. This technique is clearly unsuitable for the tracking of people.

Localization systems based only on microphones are also inadequate as these systems are highly susceptible to multipath interference in a reverberative environment wherein the microphones receive both the direct-path acoustic waves (directly from the audio source) as well as indirect-path acoustic waves echoing or reverberating off of large surfaces. This problem is further exacerbated if multiple speakers talk simultaneously.

Prior art multimedia conferencing systems employing a single camera and a plurality of microphones are also known. However, in these systems, the microphones are merely used to guide the field of view of a camera toward the speaker seated at a conference table or otherwise predeterminedly positioned relative to the microphones.

For example, U.S. Pat. No. 4,264,928 to Schober discloses a conference video system having a microphone disposed at each of the conference seats arranged in row, and an automatically adjustable mirror disposed above these seats for aiming the camera's field of view toward the speaker. The system utilizes the time two adjacent microphones receive a speaker's voice to generate the requisite control signals used for driving a servomotor to position the mirror. This system, however, does not localize or track a plurality of speakers who may speak simultaneously and move about.

U.S. Pat. No. 5,686,957 to Baker discloses an automatic, voice-directional video camera image steering system for teleconferencing. The system uses a video camera with a hemispheric lens disposed at the center of the conference table to capture a panoramic but distorted video scene around the table. To determine the direction of a speaker relative to the camera lens, the system employs an array of microphones disposed on the table and around the hemispheric lens. An audio detection circuit connected to the microphones provides information concerning the general direction of the speaker so that the system can select and display the appropriate image segment containing the speaker in the proper viewing aspect ratio using view-warping techniques. Manual camera movement or automated mechanical camera movement such as, for example, panning and zooming is thereby eliminated. However, this system, like that of Schober, also does not track or localize a speaker.

It is therefore desirable to provide a robust localization and tracking method and system which overcomes the aforementioned deficiencies of the prior art systems through the integrated use of audio and visual cues and which localizes and tracks a plurality of objects, typically people, some of whom may at times move outside a camera's field of view, speak at the same time or during a period of silence.

SUMMARY OF THE INVENTION

An advantage of the present invention is that in teleconferencing, a plurality of speakers are free to move about in front of a workstation equipped with a camera and a pair of microphones, while the speakers are tracked visually and acoustically by the workstation.

Another advantage of the present invention is that the system can automatically increase the quality of the pick-up of a speaker's voice by selectively aiming directional microphones toward the speaker so as to attain audio signals with high signal-to-noise ratio, and simultaneously, electronically magnify a segment of the image containing the speaker in order to achieve a low bandwidth video signal.

Still another advantage of the present invention is that the audio and visual information provided by the system can be used to place an avatar, i.e. a virtual representation, of the speaker, in a virtual environment.

An embodiment of the present invention provides a method for integrated audio-visual localizing and tracking of at least one object. The method includes the steps of capturing and transmitting an image of a video scene using a camera at an instant of time, identifying an object contained in the image having a preselected visual feature, and estimating a location of the object by determining an angular orientation relative to the image plane of the camera of an imaginary line extending from an optical center of the camera to a point on the image plane of the camera representing a portion of the object. The method further includes the steps of converting acoustic waves from an audio source into audio signals using at least two microphones at substantially the same time, identifying the audio source by determining a locus of points representing an estimate of the location of the audio source on the basis of the audio signals. An improved estimate of the location of the object is computed by determining the location of a region of intersection between the imaginary line and the locus.

Another embodiment of the present invention provides an integrated audio-visual method for localizing and tracking multiple objects which includes the steps of capturing and transmitting images of a video scene using a plurality of cameras at an instant of time, identifying objects having preselected visual features contained in said images, and determining an angular orientation of each of a plurality of imaginary lines extending from an optical center of each of the plurality of cameras to each point on an image plane of the camera representing a portion of each of the identified objects. The points of intersection of the imaginary lines are then grouped according to a distance measure which may, for example, be a root-mean-squared sum of these points of intersection. Further included are the steps of converting acoustic waves from a plurality of audio sources into audio signals using a plurality of microphones at substantially the same instant of time as the images are captured by the camera, determining a plurality of loci of points representing estimates of the locations of the audio sources on the basis of the audio signals from pairs of microphones selected from the plurality of microphones. A region of intersection between each of the plurality of loci and each of the grouped points of intersection of the imaginary lines is determined according to another distance measure. The region of intersection is the improved estimate of the location of an identified object.

Other features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
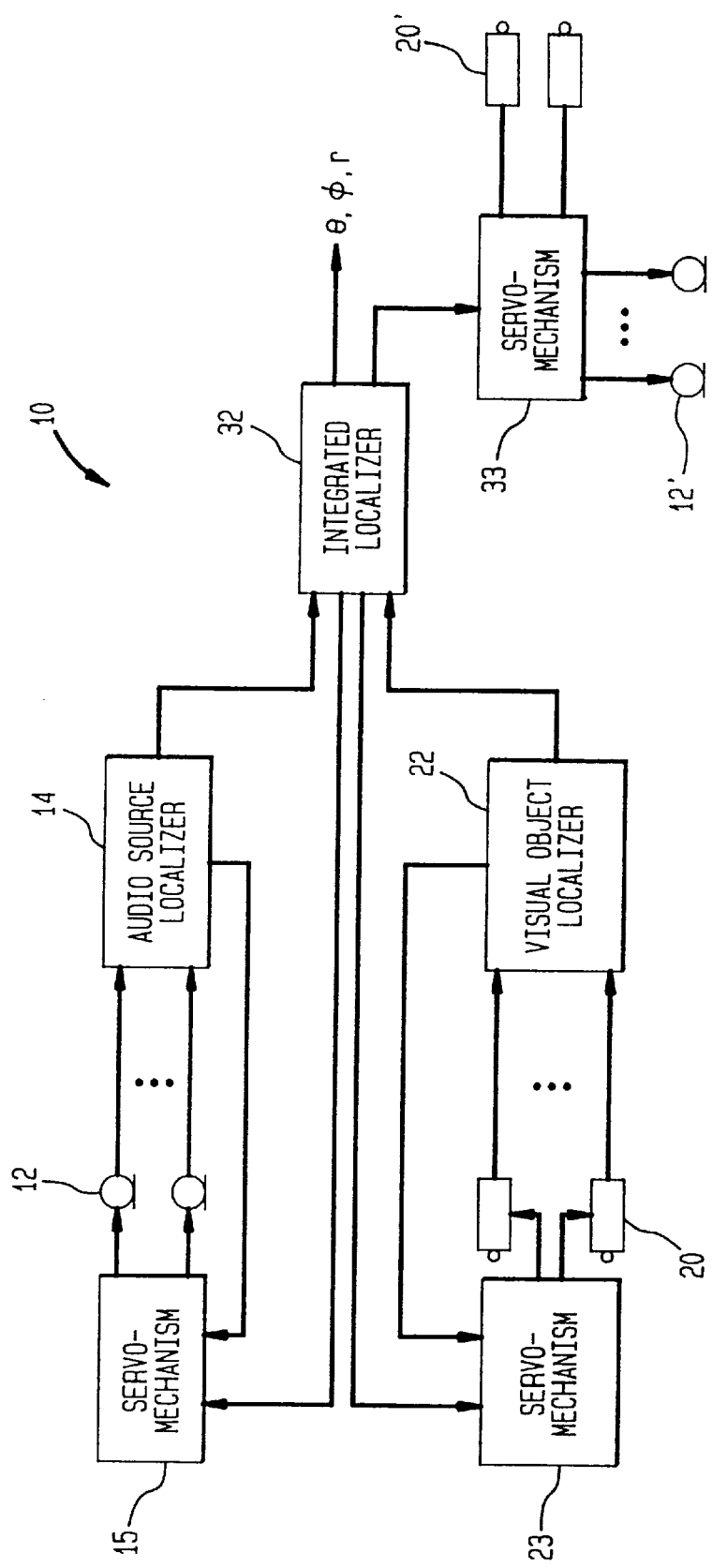
FIG. 1 depicts schematically an embodiment of the integrated audio-visual localization and tracking system of the present invention.

Referring now to the drawings, and initially to FIG. 1, the integrated audio-visual localization and tracking system 10 of the present invention, as diagramatically illustrated therein, includes a plurality of microphones 12 which may, for example, be omni-directional and/or directional microphones, for transforming the acoustic waves from a speaker or audio source (i.e. a source of acoustic waves) incident thereon into audio signals. As will be explained below, the microphones 12 are selectively spaced from each other so as to provide optimal resolution of the location of the audio source.

Connected to the microphones is an audio source localizer 14 which analyzes the audio signals from each of the microphones 12 and computes an estimate of the location of an audio source based on the principle of audio source localization described below. For simplicity, the principle is explained in terms of a system having two microphones. Persons of ordinary skill in the art will recognize from the disclosure that this principle can also be applied to a system having more than two microphones since these microphones can be grouped into pairs for audio analysis. For example, a group of three microphones $M_1$, $M_2$, and $M_3$ can be grouped into three distinct pairs of microphones consisting of: $M_1$–$M_2$, $M_1$–$M_3$, and $M_2$–$M_3$.

Figure 2:
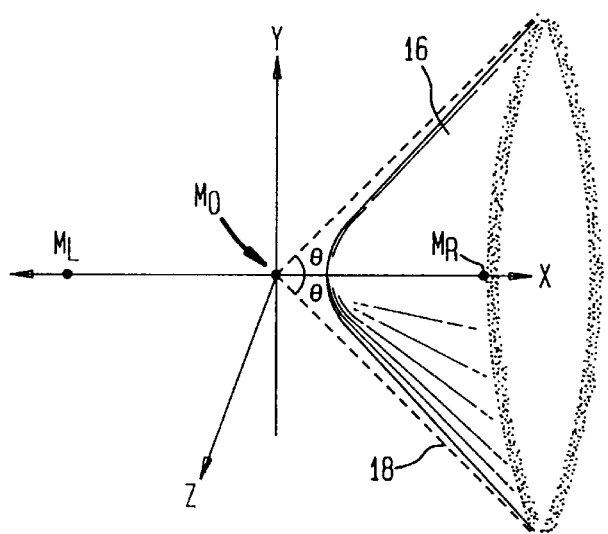
FIG. 2 illustrates graphically the localization of a speaker with two microphones.

In any event, in a two-microphone system, the estimated location of an audio source conceptually lies on a locus of points graphically illustrated in FIG. 2 as a hyperbolic shell 16 whose thickness represents the tolerance or range of inaccuracies resulting from, for example, noise in the audio signals. If the audio signals are free from noise or interference, a hyperbolic surface would be generated by the audio source localizer 14 without the thickness shown in FIG. 2. The hyperbolic surface may be described in a Cartesian coordinate system as follows:

$$\frac{x^2}{a^2} - \frac{y^2 + z^2}{b^2} = 1$$

where $a = v\Delta t/2$, $v$=the speed of sound, $\Delta t$ is the time delay of the acoustic waves reaching left and right microphones, $M_L$ and $M_R$ respectively lying along the X-axis, and $b^2 = c^2 - a^2$ (where c is half the spacing between the left and right microphones, i.e. spacing between $M_L$ and $M_R$=2c). $\theta$ is the angle formed by the dotted line 18 representing the asymptote extending from the midpoint $M_O$ and proximately along the hyperbolic shell 16. Although the solution to this equation provides two opposing hyperbolic surfaces or shells on which the audio source may be located, i.e. with one lying generally along the positive X-axis and the other disposed generally along the negative X-axis, the audio source localizer can eliminate one or the other on the basis of the time of arrival of the same acoustic waves at the left and right microphones. Thus, for example, if the acoustic waves reach the right microphone first, the audio source is located along the positive X-axis as shown in FIG. 2, and vice versa. In other words, the sign of the time delay $\Delta t$ of the acoustic waves reaching ML and MR determines which of the two hyperbolic surfaces may be located.

This two-microphone system cannot provide a specific azimuth angle ($\theta$), elevation angle ($\phi$), and radial distance (r) of the speaker with respect to $M_O$. Additional information is required to localize the speaker. In the case where the speaker is seated at a conference table, the system would be able to provide the azimuth angle ($\theta$) of the speaker. In mathematical terms, the speaker is constrained to the X-Z plane so that the elevation angle is 0° and its location lies along a line formed by the intersection of the hyperbolic surface and the X-Z plane. The intersecting line forms an azimuth angle ($\theta$) with the X-axis and extends from $M_O$ to the speaker. The azimuth angle ($\theta$) is equal to arctan(b/a) where b and a are the parameters of the hyperbola described in the equation above.

In a four-microphone system with one pair of microphones lying along the X-axis and the other pair of microphones lying along the Z-axis so that the lines connecting each of the two pairs are arranged perpendicular to each other, the estimated location of the audio source then lies generally along the asymptotic line formed between the two adjacent hyperbolic surfaces computed from the acoustical signals of the two pairs of microphones. The four-microphone system can thus provide both the azimuth and elevation angles of the audio source, an improvement over the two-microphone system; however, this system cannot provide the radial distance of the audio source relative to $M_O$ and is also susceptible to reverberant acoustic waves or the like.

As was mentioned above, the resolution or accuracy of the audio source localizer is affected by the spacing s (or 2c) between the microphones 12 and the sampling rate R of the audio signal. The number of signal samples corresponding to an angular range of 90 degrees is given by sR/v. The angular resolution is thus approximately 90 v/sR degrees. Since the angular resolution is inversely proportional to the microphone spacing, s, and sampling rate, R, higher, angular resolution (i.e. smaller value of angular resolution) can be attained by increasing the microphone spacing and the sampling rate.

The audio source localizer 14 includes a circuit or algorithm for determining or computing a confidence factor of the locus represented as hyperbolic surface 16. The confidence factor is a measure of the strength of the detection based on a number of processing factors such as, for example, signal to noise ratio. The confidence factor may range from 0 to 1, where 1 indicates the highest confidence in the detection and 0 indicates the lowest confidence in the detection. An example of a confidence factor $C_a$ associated with a locus may be expressed as follows:

$$C_a = w_1 \frac{\Omega_p}{\Omega} + w_2 \rho + w_3 F(\delta_p)$$

where $\Omega_p$ is the total number of votes within a small window around the peak (i.e. correlation peak) in the delay histogram for a microphone pair, and $\Omega$ is the total number of votes in the complete delay histogram; $\rho$ is an estimate of the ratio of direct sound or acoustic energy to the total energy (i.e. direct and reverberant energy) reaching the microphones; $\delta_p$ is the time delay between the detected peaks in the current frame and the previous frame and $F(\delta)$ is a Gaussian distribution with mean zero and variance dependent on the expected motion of the audio source; and $w_1$, $w_2$ and $w_3$ are positive weighting factors such that $w_1+w_2+w_3=1$.

The system 10 also includes a first electronic or electromechanical servomechanism 15 connected to the audio source localizer 14 for varying the spacing between the microphones 12 so that the angular resolution of the audio source can be adjusted or fine-tuned. The servomechanism 15 can also be used to orient the directional microphones to increase the signal-to-noise ratio so as to increase the accuracy of the location estimate of the audio source.

As shown in FIG. 1, the system further includes a plurality of cameras 20, a visual object localizer 22 for estimating the location of the speaker or object, and a second electronic or electromechanical servomechanism 23 for panning or zooming the cameras 20. Each of the cameras 20 may be equipped with any lens attachment including wide-angle lens or fish-eye lens. The cameras 20 are so disposed in the user environment that the visual features or cues such as, for example, the head of a person, critical to the visual object localizer 22 are readily seen by the camera 20.

The principle of this visual object localizer 22 is described as follows. In a camera-based system, the locus of points representing the estimated location of, for example, a visual feature of a speaker is a straight line projecting from the optical center ($C_O$) of the camera through the image plane of the camera and to a point or feature of the speaker. Provided the image plane is parallel to the X-Y plane of the global or world Cartesian coordinate system, the locus in the form of a straight line can be expressed in the following parametric form:

$$\begin{bmatrix} x \\ y \\ z \end{bmatrix} = \begin{bmatrix} C_x \\ C_y \\ C_z \end{bmatrix} + \alpha \begin{bmatrix} i_x \\ i_y \\ f \end{bmatrix}$$

where $C_x$, $C_y$, and $C_z$ are the coordinates of the optical center ($C_O$) of the camera, $i_x$ and $i_y$ are the coordinates of the image of the visual feature on the image plane (expressed in the local Cartesian coordinate system of the image plane), $\alpha$ is the parameter for determining the different points on the line, and f is the focal length of the camera lens. The aforementioned parameters may be expressed, for example, in terms of pixels or millimeters. This equation can be further simplified when the optical center of the camera is located at the origin of the global coordinate system, since $C_x=C_y=C_z=0$ in this case.

Figure 3:
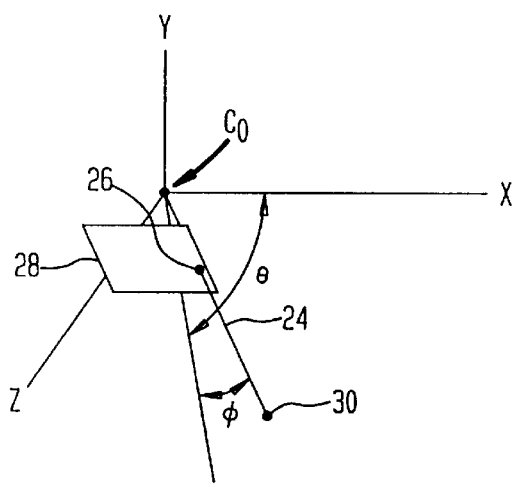
FIG. 3 illustrates graphically the localization of a speaker using only one camera.

The visual object localizer 22 hence provides in every frame of the video sequence both the azimuth angle ($\theta$) and elevation angle ($\phi$) of the straight line 24, relative to the image plane 28 of the camera, projecting from the optical center ($C_0$) of the camera through point 26 on the image plane 28 representing a visual feature of a portion of the speaker or object, as shown in FIG. 3. Point 30 is a point on the object. The accuracy of the azimuth and elevation angles depends on a number of factors including the field of view of the camera and the image resolution of the screen. It has been found that for a 60 degree field of view camera with 360 horizontal pixels, the angular resolution is about 0.16 degree, assuming the image is accurate to within one pixel. If, however, the degree of uncertainty is, for example, within 10 pixels, then the angular resolution is about 1.6 degree, which is acceptable for many applications.

In an embodiment having two or more cameras, the visual object localizer provides a locus in the form of a point or a cluster of points representing the intersection of the straight lines extending from $C_O$ of each of the cameras to the visual feature of the object, provided the cameras are spaced from each other. In this case, the visual object localizer 22 provides the radial distance of the object from the camera 20.

Similar to the audio localizer 14, the visual object localizer 22 also includes a circuit or algorithm for computing the confidence factor or measure for the locus. In the case of detecting the head of a speaker, the confidence factor $C_V$ of the locus, i.e. the straight line projecting from the optical center of the camera to the imaged object, may be expressed as follows:

$$C_v = w_1 \frac{\Gamma_c}{\Gamma} + w_2 \frac{\lambda_f}{\lambda} + w_3 F(d_p)$$

where $\Gamma$ is the total number of contour pixels in the detected head region, and $\Gamma_c$ is the number of contour pixels in the detected head region that lie on a circular ring corresponding to the shape of a head; $\lambda$ is the total number of pixels within the detected head region and $\lambda_f$ is the number of pixels within the dtected head region having a flesh tone; $d_p$ is the distance of the detected head location in the current frame from the nearest detected head location in the previous frame, and F(d) is the Gaussian distribution with mean zero and variance r where r is proportional to the expected radius of a head; and $w_1$, $w_2$ and $w_3$ are positive weighting factors such that $w_1+w_2+w_3=1$.

The visual object localizer 22 is preferably connected to the electronic or electromechanical servomechanism 23 for controlling the cameras 20 so as to increase the resolution of the object localization by, for example, electronically segmenting a portion of the image containing the localized object.

In accordance with the invention, the system 10 advantageously includes an integrated localizer 32 connected to both the visual object localizer 22 and the audio source localizer 14. The integrated localizer 32 integrates the output of the visual object localizer 22 and the audio source localizer 14 by identifying the locus of points which are substantially common to or represent an intersection of the loci provided by the audio source localizer 14 and the visual object localizer 22. The integrated localizer 32 can thus provide the radial distance (r) between the object and a reference point such as, for example, $M_O$ or $C_O$, as well as the azimuth and elevation angles, $\theta$ and $\phi$, respectively. Preferably, the optical center $C_O$ of the camera 10 is disposed at a distance away from $M_O$, the center of the line connecting a microphone pair, so that the intersection of the loci can be clearly formed.

Figure 4:
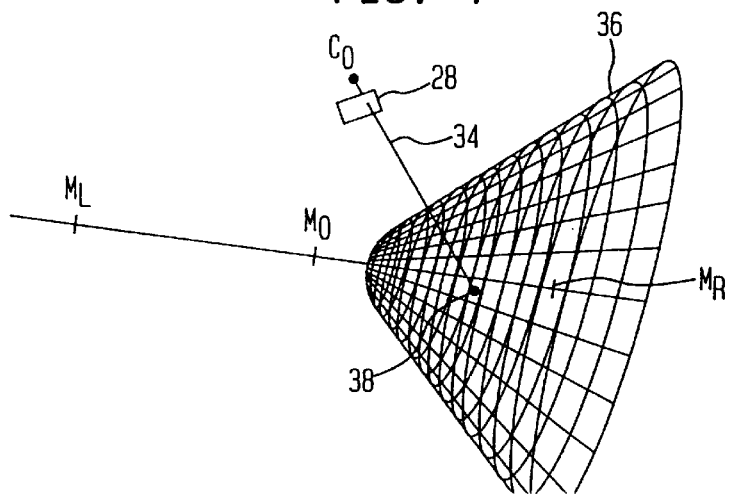
FIG. 4 illustrates graphically the localization of a speaker using two microphones and one camera.

FIG. 4 illustrates graphically the loci generated by an embodiment of a system having two microphones and a single camera wherein the locus of points generated by the visual object localizer 22 is the straight line 34 and the locus of points generated by the audio source localizer 14 is the hyperbolic surface 36. As depicted, the optical center $C_O$ of the camera 10 is disposed a distance away from the center $M_O$ of the microphone pair, $M_L$ and $M_R$. The intersecting point 38 of these two loci is therefore the estimated location of the object as computed or generated by the integrated localizer 32. Thus, the integrated localizer 32 can output the azimuth angle, elevation angle and radial distance of the object 38.

The integrated localizer 32 is preferably connected to the servomechanisms 15 and 23 for moving and/or orienting the microphones 12 and the cameras 20 so that the integrated localizer 32 can provide feedback control to the cameras 12 and the microphones 20 so as to increase the resolution of the localization by the audio source localizer 14 and/or the visual object localizer 22. In a presently preferred embodiment, the output of the integrated localizer 32 is also connected to another electronic or electromechanical servomechanism 33 which controls a plurality of directional microphones 12' and zoom cameras 20'. Advantageously, the servomechanism 33 responds to the control signals of integrated localizer 32 and selectively moves and/or orients the directional microphones 12' toward the identified speakers in, for example, a teleconference so as to increase the strength of the audio signals of or otherwise improve the pick-up of sounds from the speakers. Simultaneously, the servomechanism 33, responsive to control signals of the integrated localizer 32, selectively pans and/or zooms the cameras 20' so as to increase the image quality of the speakers by, for example, increasing the resolution of the image and/or lowering the video bandwidth.

Preferably, the integrated localizer 32 also includes means for recording and matching the locations of each of the speakers with the voice or sounds of each speaker from one instant of time to another so as to track the location and acoustic history of each speaker.

It is contemplated that the system 10 may in one embodiment be packaged as a compact, portable digital computer workstation equipped with cameras and microphones or as a distributed system wherein the cameras and microphones may be selectively disposed about a room for optimal video coverage and sound pick-up.

In operation, an embodiment of the integrated audio-video system 10 having a plurality of microphones 12 and a plurality of cameras 20 functions as follows. The microphones 12 convert the sounds or acoustic waves from each audio source (e.g. speaker, sound generating devices etc.) into audio signals. The audio source localizer 14 then analyzes the audio signals and generates a plurality of hyperbolic surfaces or shells describing the locations of the audio sources and assigns a confidence measure or factor as, for example, described above, which measure may be based on audio processing factors such as, for example, the strength of the correlation peak, signal to noise ratio and direct-to-reverberant energy ratio. At substantially the same time, the cameras 20 capture images of the video scene containing the objects (e.g. speakers) and convert the images into video signals. The visual object localizer 22 then analyzes the video signals and identifies objects having a preselected visual cue such as, for example, facial features which may be defined in terms of the color and shape of the identified objects. The visual object localizer 22 also assigns a confidence factor to each identified object. The identified objects from each camera are then matched or correlated with each other so as to identify the region or closest points of intersection of the loci of each camera. Using an iterative process, the visual object localizer 22 determines visual clusters of closest points of intersection grouped by a distance measure such as, for example, root-mean-squared sum of the points of intersection of the imaginary lines weighted by the confidence factors so that the number of visual clusters corresponds to the number of identified objects. Some of these visual clusters may be represented by three-dimensional points while others may be represented by lines in space as an object may be in the view of only one camera.

The integrated localizer 32 then uses an iterative process to find the closest points of intersections between the visual clusters derived by the visual object localizer 22 and the loci (e.g. hyperbolic surfaces) derived by the audio source localizer 14 based on a distance measure such as, for example, root-mean-squared sum of the points of intersection weighted by the confidence factors so that the number of audio-visual clusters corresponds to the number of objects. Points in the visual clusters which satisfy the distance measure are assigned as audio-visual clusters and which represent an improved estimate of the location of the identified object. In the case of visual clusters represented by three-dimensional points, the intersections can be determined by identifying visual cluster points which are disposed within a selected distance from the loci generated by the audio source localizer 14. In the case where the visual clusters are represented by lines, the points of intersection can be clustered by a root-mean-squared sum of individual intersections weighted by confidence factors as determined by the audio source localizer 14 and the visual object localizer 22. The integrated localizer 32 uses an iterative process to ensure that only one source from a single microphone pair is placed in a given cluster. Loci of audio sources that are not assigned to any audio-visual cluster are checked for intersections between them and then clustered and classified as audio-only clusters. Loci of visual sources that are not assigned to any audio-visual clusters are classified as visual-only clusters. Weak audio-only clusters are eliminated based on, for example, a threshold value of the confidence factor determined by the audio source localizer 14. Similarly, weak visual-only clusters are eliminated based on, for example, a threshold value of the confidence factor determined by the visual object localizer 22.

Preferably, the integrated localizer 32 then records and matches the locations of each of the speakers with the voice or sounds of each speaker from one instant of time to another so that a user can obtain a detailed summary of the trajectory as well as images and sounds of each identified speaker. Such a summary is also useful, for example, for driving avatars of each speaker in a virtual environment. The summary may also be in the form of a transcript for the user. The integrated localizer 32 provides tracking information in the following form: $T=((\theta_1, \phi_1, r_1, t_1), (\theta_2\phi_2 r_2, t_2), \ldots, (\theta_1, \phi_i, r_i, t_i), \ldots, (\theta_n, \phi_n, t_n))$ where $(\theta_i, \phi_i, r_i, t_i)$ represents the three-dimensional location of the clusters at time instant $t_i$. The parameters, $\theta$, $\phi$, and r are as defined above. In addition, a parameter $\tau_i$ is assigned or otherwise associated with the cluster (representing the location of an identified object) at each instant $t_i$ to indicate whether the cluster is a visual-only cluster, audio-only cluster, or an audio-visual cluster at that instant of time. The trajectory T with the associated classification parameters $\tau_i$ provides a concise summary of the visual and acoustic activity in the scene i.e. how each object moved about in the scene and the periods of time in which the object was silent and the periods in which it was an audio source. The trajectory T with the associated parameters $\tau_i$ are output by the integrated localizer 32 and can be recorded.

A further detailed summary of the acoustic history and images of the identified object may also be provided by the integrated localizer by associating audio signals of the identified object with the sequence of images (or portions of images) to the trajectory T of the identified object. The integrated localizer 32 performs this function by associating or matching an image of the object with the trajectory of the object at each instant of time. This image may be an image from one of the cameras selected based on the position of the object or a portion (or segment) of an image from one of the cameras showing the identified object. The image or image segment may, for example, be a rectangular region around the detected head region of a person. The center of the rectangular region may be the center of the detected head location in the image plane and the dimensions of the rectangular region may be proportional to the estimated radius of the head in the image plane.

The integrated localizer 32 also matches or otherwise associates the acoustic history of the identified object with the trajectory of the object at each instant of time. The audio signals representing the sound track of that object may be selected from any one of the microphones used by the system 10 based on their signal-to-noise ratios. In other words, the system 10 automatically selects the audio signals having the best sound quality for the purpose of providing a transcript of, for example, a conference participant.

In another embodiment, the integrated localizer 32 performs the steps of (1) segmenting a portion of the image containing the identified object; (2) associating the audio signals with the identified object, the improved location estimate and the instant of time; (3) associating the portion of the image containing the identified object with the improved location estimate and the instant of time; (4) recording the improved location estimate, the segmented portion of the image containing the identified object, the audio signals, and the instant of time.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An integrated audio-visual method for localizing and tracking at least one object, comprising the steps of:

capturing and transmitting an image of a video scene using a camera at an instant of time;

identifying an object contained in said image having a preselected visual feature;

estimating a location of the object by determining an angular orientation relative to the image plane of the camera of an imaginary line extending from an optical center of the camera to a point on the image plane of the camera representing a portion of the object;

converting acoustic waves from an audio source into audio signals using at least two microphones at substantially said instant of time;

identifying the audio source by determining on the basis of the audio signals a locus of points representing an estimate of the location of the audio source; and computing the location of a region of intersection between the imaginary line and the locus, the intersection region being an improved estimate of the location of the object.

2. The integrated audio-visual method of claim 1, further comprising the steps of segmenting a portion of the image containing the identified object; associating the audio signals with the identified object, the improved location estimate and said instant of time; associating the portion of the image containing the identified object with the improved location estimate and said instant of time; and recording the improved location estimate, the segmented portion of the image containing the identified object, the audio signals, and said instant of time.

3. An apparatus for integrated audio-visual localizing and tracking of at least one object:

a camera for capturing an image of a video scene and generating video signals representing the image at an instant of time;

visual object localizer means connected to said camera for receiving the video signals, identifying an object having a preselected visual cue contained in said image, and for estimating a location of the object by determining the angular orientation of an imaginary line extending from an optical center of the camera to a point on an image plane of the camera representing a portion of the object;

at least two microphones operative to pick up and convert acoustic waves from an audio source into audio signals at substantially said instant of time;

audio source localizer means connected to said at least two microphones for determining a locus of points representing an estimate of the location of the audio source generating the acoustical waves on the basis of the audio signals; and integrated localizer means operatively connected to said visual object localizer means and said audio source localizer means for receiving information relating to said imaginary line and said locus for computing an improved estimate of the location of the object by determining the location of a region of intersection between said imaginary line and said locus of points.

4. The apparatus of claim 3, further comprising another pair of microphones so arranged that imaginary straight lines connecting each pair of microphones intersect perpendicularly with each other so that the locus is a straight line extending from the intersecting point of said imaginary straight lines connecting said microphone pairs.

5. The apparatus of claim 3, wherein said integrated localizer means outputs signals relating to said improved estimate of the location of the object, and further comprising a servomechanism connected to said integrated localizer means and a plurality of cameras and directional microphones connected to said servomechanism, said servomechanism being responsive to the signals from said integrated localizer means to direct said plurality of cameras and directional microphones to the improved estimate of the location of the object computed by said integrated localizer means so as to improve the quality of the image and the pick-up of acoustic waves from the improved estimate of the location of the object.

6. An integrated audio-visual method for localizing and tracking multiple objects, comprising the steps of:

capturing and transmitting images of a video scene using a plurality of cameras at an instant of time;

identifying objects having preselected visual features contained in said images;

determining an angular orientation of each of a plurality of imaginary lines extending from an optical center of each of the plurality of cameras to each point on an image plane of the camera representing a portion of each of the identified objects;

grouping points of intersection of said imaginary lines according to a distance measure;

converting acoustic waves from a plurality of audio sources into audio signals using a plurality of microphones at substantially said instant of time;

determining a plurality of loci of points representing estimates of locations of the audio sources on the basis of the audio signals from pairs of microphones selected from said plurality of microphones; and determining a region of intersection between each of said plurality of loci and each of said grouped points of intersection of said imaginary lines according to another distance measure, said region of intersection being an improved estimate of a location of an identified object.

7. The integrated audio-visual method of claim 6, further comprising the step of defining each group of points of intersection as a visual cluster, wherein said distance measure employs a root-mean-squared sum of positions of points of intersection of said imaginary lines weighted by confidence factors so that there is an equal number of visual clusters and identified objects.

8. The integrated audio-visual method of claim 6, further comprising the step of defining said region of intersection as an audio-visual cluster, wherein said another distance measure employs a root-mean-squared sum of positions of points of intersection of said plurality of loci and said grouped points of intersection of said imaginary lines weighted by confidence factors so that there is an equal number of audio-visual clusters and identified objects.

9. The method of claim 6, wherein the objects are persons, and further comprising the steps of:

defining each of the grouped points of intersection as a visual cluster;

defining each of the plurality of loci as an audio cluster;

defining said region of intersection as an audio-visual cluster;

associating audio signals used for determining at least a portion of each said audio-visual cluster with an identified person whose location corresponds to the location represented by said audio-visual cluster; and associating an image used for determining at least a portion of said audio-visual cluster with an identified person whose location corresponds to the location represented by said audio-visual cluster.

10. The method of claim 9, further comprising the steps of:

defining a visual cluster disposed outside said region of intersection as a visual-only cluster; and associating at least a portion of an image used for determining at least a portion of said visual-only cluster with an identified person whose location corresponds to a location represented by said each said visual-only cluster.

11. The method of claim 10, further comprising the step of recording said associated image of said identified person, said location of said identified person, and said instant of time.

12. The method of claim 9, further comprising the steps of:

defining an audio-only cluster as an audio cluster disposed outside said region of intersection; and associating audio signals used for determining at least a portion of said audio-only cluster with an audio source whose location corresponds to the location represented by said audio-only cluster.

13. The method of claim 12, further comprising the step of recording said associated audio signals of said audio source, said location of said audio source, and said instant of time.

14. The method of claim 9, further comprising the step of recording said associated image and associated audio signal of said identified person, said location of said identified person, and said instant of time.

15. The method of claim 9, wherein said distance measure employs a root-mean-squared sum of the positions of the points of intersection weighted by confidence factors so that there is an equal number of visual clusters and identified persons.

16. The method of claim 9, wherein said another distance measure employs a root-mean-squared sum of positions of points of intersection of said plurality of loci and said grouped points of intersection of said imaginary lines weighted by confidence factors so that there is an equal number of audio-visual clusters and identified persons.

* * * * *